US008779916B2

(12) United States Patent
Van Camp et al.

(10) Patent No.: US 8,779,916 B2
(45) Date of Patent: Jul. 15, 2014

(54) TIMELINE PRESENTATIONS OF PROCESS CONTROL SYSTEM ALARMS

(75) Inventors: Kim Ordean Van Camp, Georgetown, TX (US); Bruce Hubert Campney, Pflugerville, TX (US); Trevor Duncan Schleiss, Austin, TX (US); Glenn Mclaughlin, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 238 days.

(21) Appl. No.: 13/279,583

(22) Filed: Oct. 24, 2011

(65) Prior Publication Data

US 2013/0099916 A1    Apr. 25, 2013

(51) Int. Cl.
*G08B 29/00* (2006.01)

(52) U.S. Cl.
USPC ........... 340/506; 340/507; 340/508; 340/679; 340/815.47; 345/440; 345/440.1; 700/83; 700/110; 715/771; 715/772

(58) Field of Classification Search
CPC ........ G01F 23/60; G08B 23/00; G08B 25/14; G08B 13/19682; G08B 25/008; G06Q 10/109; G05B 23/0272; G05B 19/04; G05B 19/048; G05B 23/00; G05B 23/027
USPC .................... 340/502–516, 815.47, 679–683, 340/815.4–815.57; 345/736, 440–440.2; 700/98, 110; 715/771–772
See application file for complete search history.

(56) References Cited

U.S. PATENT DOCUMENTS

| 7,289,935 | B1 | 10/2007 | Hugo |
| 8,032,621 | B1 | 10/2011 | Upalekar |
| 8,269,620 | B2 | 9/2012 | Bullemer et al. |
| 2009/0125825 | A1 | 5/2009 | Rye et al. |
| 2010/0156654 | A1* | 6/2010 | Bullemer et al. .......... 340/691.6 |
| 2010/0156655 | A1 | 6/2010 | Bullemer et al. |
| 2012/0083917 | A1 | 4/2012 | Zhou et al. |

FOREIGN PATENT DOCUMENTS

| GB | 2470995 | 12/2010 |
| GB | 2483536 | 3/2012 |
| WO | 0102919 | 1/2001 |
| WO | 2013003165 | 1/2013 |

OTHER PUBLICATIONS

United Kingdom Intellectual Property Office, "Search Report," issued in connection with UK Application No. GB1219047.6, dated Feb. 22, 2013 (2 pages).

United Kingdom Intellectual Property Office, "Search Report," issued in connection with UK Application No. GB 1219048.4, dated Feb. 22, 2013 (2 pages).

United States Patent and Trademark Office, "Office Action", issued in connection with U.S. Appl. No. 13/279,589, mailed on Apr. 3, 2014, 31 pages.

* cited by examiner

*Primary Examiner* — George Bugg
*Assistant Examiner* — Sharmin Akhter
(74) *Attorney, Agent, or Firm* — Hanley, Flight and Zimmerman, LLC (57) ABSTRACT

Timeline presentations of process control system alarms are described. An operator interface apparatus for a process control system is described that includes an operator display module to present an operator application on a display. The operator interface also includes an alarm presentation interface to be presented on the display via the operator application. The alarm presentation interface includes a timeline to graphically indicate a temporal relationship of a plurality of active alarms of the process control system.

32 Claims, 6 Drawing Sheets

TIMELINE PRESENTATIONS OF PROCESS CONTROL SYSTEM ALARMS

FIELD OF THE DISCLOSURE

This disclosure relates generally to process control systems and, more particularly, to timeline presentations of process control system alarms.

BACKGROUND

Process control systems, like those used in chemical, petroleum or other processes, typically include one or more process controllers communicatively coupled to one or more field devices via analog, digital or combined analog/digital buses. The field devices, which may be, for example, valves, valve positioners, switches and transmitters (e.g., temperature, pressure and flow rate sensors), perform process control functions within the process such as opening or closing valves and measuring process control parameters. The process controllers receive signals indicative of process measurements made by the field devices and then process this information to generate control signals to implement control routines, to make other process control decisions, and to initiate process control system alarms.

Information from the field devices and/or the controller is usually made available over a data highway or communication network to one or more other hardware devices, such as operator workstations, personal computers, data historians, report generators, centralized databases, etc. Such devices are typically located in control rooms and/or other locations remotely situated relative to the harsher plant environment. These hardware devices, for example, run applications that enable an operator to perform any of a variety of functions with respect to the process of a process control system, such as viewing the current state of the process, changing an operating state, changing settings of a process control routine, modifying the operation of the process controllers and/or the field devices, viewing alarms generated by field devices and/or process controllers, simulating the operation of the process for the purpose of training personnel and/or evaluating the process, etc.

These hardware devices typically include one or more operator interface displays to display pertinent information regarding the operating state(s) of the control system(s) and/or the devices within the control system. Example displays take the form of alarming displays that receive and/or display alarms generated by controllers or devices within the process control system, control displays that indicate the operating state(s) of the controller(s) and other device(s) within the process control system, etc.

In a process control system it is common for thousands of alarms to be defined within the process control system to notify operators of the process control system of potential problems. Alarms are defined, for example, to protect people and/or equipment, to avoid environmental incidents, and/or to ensure product quality during production. Each alarm is typically defined by one or more settings (e.g., an alarm limit) that define when a problem has occurred and/or trigger the alarm, and a priority (e.g., critical or warning) to define the importance of the alarm relative to other alarms.

Typically, alarms are presented (e.g., displayed) to operators in list or tabular format. In such formats, each alarm is presented as a single line in the list with specific data that may be relevant to inform an operator of the state of the control system. Data provided in an alarm list may include, for example, a description of the alarm, the time the alarm was triggered, the source of the alarm, the importance or priority of the alarm, the state of the alarm (e.g., acknowledged or not, active or not), the parameter that triggered the alarm, the value of the parameter, etc. As information is received from process controllers and/or field devices, the alarm list data may be updated in real time to allow the operators access to current information regarding all active alarms.

SUMMARY

Methods and apparatus to present a timeline presentation of process control system alarms are disclosed. In one example, an operator interface apparatus for a process control system includes an operator display module to present an operator application on a display. The operator interface also includes an alarm presentation interface to be presented on the display via the operator application. The alarm presentation interface includes a timeline to graphically indicate a temporal relationship of a plurality of active alarms of the process control system.

In another example, a method involves receiving new and/or updated alarm data; modifying the timeline based on the alarm data; and displaying the modified timeline via an operator interface.

DETAILED DESCRIPTION

It is not uncommon for process control system operators to be faced with multiple alarms at any given moment. While an operator may be able to adequately manage up to five alarms in a ten minute period comfortably, exceeding that rate of alarms can become overwhelming. When many alarms are triggered in a small timeframe, commonly referred to as an alarm flood, the resulting amount of information may exceed an operator's capacity to analyze and respond effectively to the alarms.

Additionally, because alarms typically are presented in list format, the operator is unlikely to grasp the entire situation quickly. For example, the number of alarms may exceed the vertical space provided for the alarm list, thereby requiring the operator to scroll through the list or otherwise sort and/or filter the alarm list to review all the alarms. This task is often complicated by the fact that alarm data is typically updated in real time. Thus, if an alarm clears or changes state, or additional alarms are triggered, the operator may miss one or more of these changes. The only way to avoid this is for the operator to repeatedly and frequently reread the list of alarm information, thereby sacrificing precious time to address the alarm flood and avoid a potentially significant process control system failure.

Furthermore, it is common for a particular circumstance and/or state of a process control system to result in a cascade of predictable alarms, often being tripped in a predictable order. The initial circumstance and/or state of the process control system that causes such a series of alarms is referred to as a root cause. The faster operators are able to identify a root cause of an alarm flood, the faster they are able to take necessary actions to correct any errors, thereby minimizing the effects of a process control system failure. As such, special operator training may be required for predetermined high-consequence abnormal process conditions, where operators are expected to recognize expected alarm activation patterns (e.g., order of occurrence and spacing). However, operators, equipped only with an alarm list that is sorted and/or filtered while the data itself is changing, are unlikely to recognize the relationships of the alarms to identify the common pattern and root cause.

Accordingly, the examples described herein may be used to display a timeline, in conjunction with but independent of an alarm list, to graphically indicate an overall state of a process control system by populating the timeline with icons representing each of the alarms currently active in the process control system. The priority of each alarm is represented by the shape and color of the corresponding icon. Also, each alarm may be shifted incrementally along a defined scale of the timeline to preserve the temporal relationship of the active alarms to enable the operator to recognize patterns and determine the causal relations of alarms during an alarm flood and/or at other times. To avoid scrolling back and forth along the timeline to alarms that may be from the distant past, the examples described herein enable the timeline to be divided into separate time spans where the scale of each span is different and can be spatially adjusted relative to each other across the display of the operator interface, thereby enabling the operator to quickly perceive all active alarms regardless of how many alarms are active.

Figure 1:
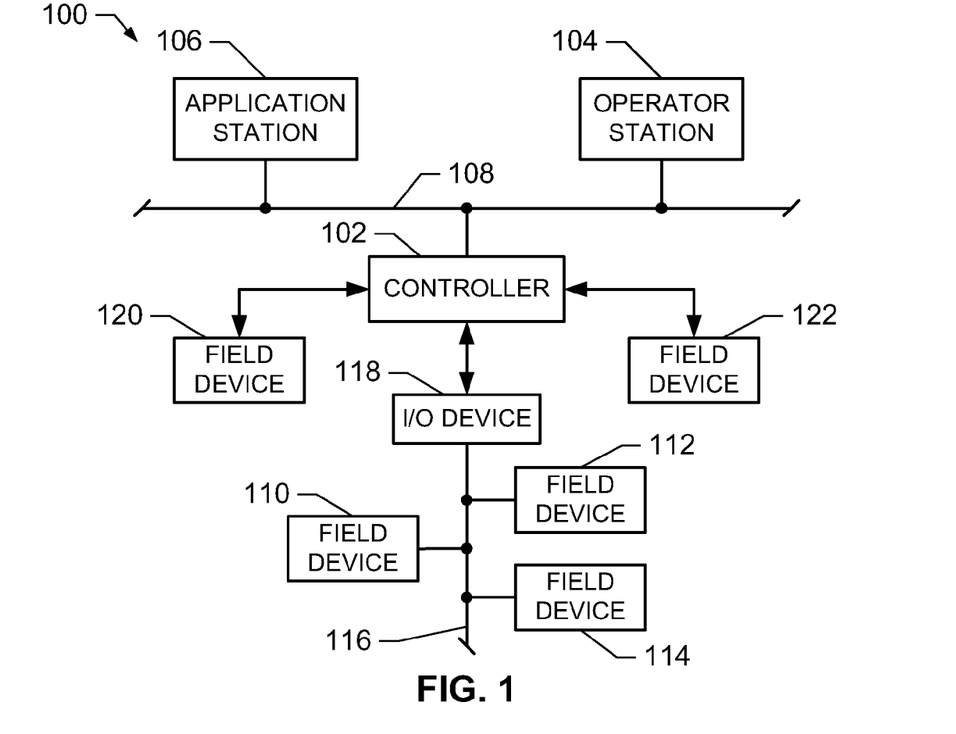
FIG. 1 is a schematic illustration of an example process control system.

FIG. 1 is a schematic illustration of an example process control system 100. The example process control system 100 of FIG. 1 includes one or more process controllers (one of which is designated at reference numeral 102), one or more operator stations (one of which is designated at reference numeral 104), and one or more workstations (one of which are designated at reference numeral 106). The example process controller 102, the example operator station 104 and the example workstation 106 are communicatively coupled via a bus and/or local area network (LAN) 108, which is commonly referred to as an application control network (ACN).

The example operator station 104 of FIG. 1 allows an operator to review and/or operate one or more operator display screens and/or applications that enable the operator to view process control system variables, view process control system states, view process control system conditions, view process control system alarms, and/or change process control system settings (e.g., set points, operating states, clear alarms, silence alarms, etc.). An example manner of implementing the example operator station 104 of FIG. 1 is described below in connection with FIG. 2. Example operator display applications that may be used to implement the example operator station 104 are described below in connection with FIGS. 3A-3C.

The example operator station 104 includes and/or implements an alarm presentation interface (e.g., the example alarm presentation interface of FIGS. 3A-3C) to graphically display all active alarms in a timeline to allow process control system operators to visually perceive the temporal relationships of the alarms, as well as state changes and/or manual control actions. The alarm presentation interface also provides summary graphics based on aggregated data for all active alarms to provide operators a quick and intuitive means of acquiring an overall understanding of the state of the processing control system and assess relationships between different alarms. Furthermore, the alarm presentation interface enables the creation of traditional alarm lists populated by alarms selected from the alarm presentation interface. An additional aspect of the example operator station 104 of FIG. 1 includes capturing the timeline in memory to be replayed for training (e.g., to learn to recognize noteworthy alarm patterns) and/or to conduct post-mortem investigations.

The example workstation 106 of FIG. 1 may be configured as an application station to perform one or more information technology applications, user-interactive applications and/or communication applications. For example, the application station 106 may be configured to perform primarily process control-related applications, while another application station (not shown) may be configured to perform primarily communication applications that enable the process control system 100 to communicate with other devices or systems using any desired communication media (e.g., wireless, hardwired, etc.) and protocols (e.g., HTTP, SOAP, etc.). The example operator station 104 and the example workstation 106 of FIG. 1 may be implemented using one or more workstations and/or any other suitable computer systems and/or processing systems. For example, the operator station 104 and/or workstation 106 could be implemented using single processor personal computers, single or multi-processor workstations, etc.

The example LAN 108 of FIG. 1 may be implemented using any desired communication medium and protocol. For example, the example LAN 108 may be based on a hardwired and/or wireless Ethernet communication scheme. However, as will be readily appreciated by those having ordinary skill in the art, any other suitable communication medium(s) and/or protocol(s) could be used. Further, although a single LAN 108 is illustrated in FIG. 1, more than one LAN and/or other alternative pieces of communication hardware may be used to provide redundant communication paths between the example systems of FIG. 1.

The example controller 102 of FIG. 1 is coupled to a plurality of smart field devices 110, 112 and 114 via a digital data bus 116 and an input/output (I/O) gateway 118. The smart field devices 110, 112, and 114 may be Fieldbus compliant valves, actuators, sensors, etc., in which case the smart field devices 110, 112, and 114 communicate via the digital data bus 116 using the well-known Foundation Fieldbus protocol. Of course, other types of smart field devices and communication protocols could be used instead. For example, the smart field devices 110, 112, and 114 could instead be Profibus and/or HART compliant devices that communicate via the data bus 116 using the well-known Profibus and HART communication protocols. Additional I/O devices (similar and/or identical to the I/O gateway 118 may be coupled to the controller 102 to enable additional groups of smart field devices, which may be Foundation Fieldbus devices, HART devices, etc., to communicate with the controller 102.

In addition to the example smart field devices 110, 112, and 114, one or more non-smart field devices 120 and 122 may be communicatively coupled to the example controller 102. The example non-smart field devices 120 and 122 of FIG. 1 may be, for example, conventional 4-20 milliamp (mA) or 0-10 volts direct current (VDC) devices that communicate with the controller 102 via respective hardwired links.

The example controller 102 of FIG. 1 may be, for example, a DeltaV™ controller sold by Fisher-Rosemount Systems, Inc., an Emerson Process Management company. However, any other controller could be used instead. Further, while only one controller 102 is shown in FIG. 1, additional controllers and/or process control platforms of any desired type and/or combination of types could be coupled to the LAN 108. In any case, the example controller 102 performs one or more process control routines associated with the process control system 100 that have been generated by a system engineer and/or other system operator using the operator station 104 and which have been downloaded to and/or instantiated in the controller 102.

While FIG. 1 illustrates an example process control system 100 within which the methods and apparatus to control information presented to process control system operators described in greater detail below may be advantageously employed, persons of ordinary skill in the art will readily appreciate that the methods and apparatus to control information presented to operators described herein may, if desired, be advantageously employed in other process plants and/or process control systems of greater or less complexity (e.g., having more than one controller, across more than one geographic location, etc.) than the illustrated example of FIG. 1.

Figure 2:
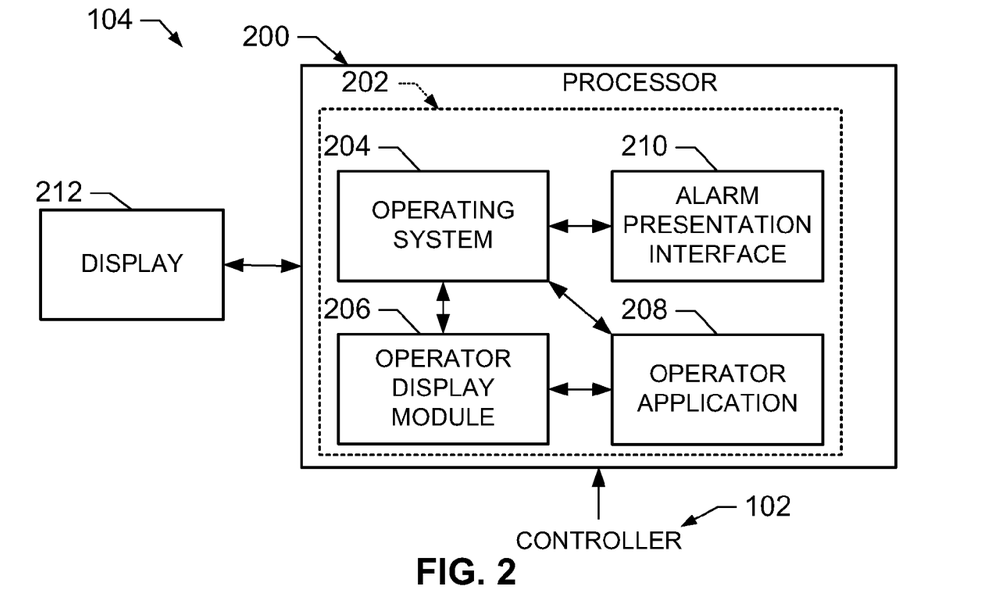
FIG. 2 illustrates an example manner of implementing the example operator station of FIG. 1.

FIG. 2 illustrates an example manner of implementing the example operator station 104 of FIG. 1. The example operator station 104 of FIG. 2 includes at least one programmable processor 200. The example processor 200 of FIG. 2 executes coded instructions present in a main memory 202 of the processor 200 (e.g., within a random-access memory (RAM) and/or a read-only memory (ROM)). The processor 200 may be any type of processing unit, such as a processor core, a processor and/or a microcontroller. The processor 200 may execute, among other things, an operating system 204, an operator display module 206, an operator application 208, and an alarm presentation interface 210. An example operating system 204 is an operating system from Microsoft®. The example main memory 202 of FIG. 2 may be implemented by and/or within the processor 200 and/or may be one or more memories and/or memory devices operatively coupled to the processor 200.

To allow an operator to interact with the example processor 200, the example operator station 104 of FIG. 2 includes any type of display 212. Example displays 212 include, but are not limited to, a computer monitor, a computer screen, a television, a mobile device (e.g., a smart phone, a Blackberry™ and/or an iPhone™), etc. capable to display user interfaces and/or applications implemented by the processor 200 and/or, more generally, the example operator station 104.

The example operating system 204 of FIG. 2 displays and/or facilitates the display of application user interfaces (e.g., the alarm presentation user interface 210) by and/or at the example display 212. To facilitate operator interactions with applications implemented by the example operator station 104, the example operating system 204 implements an application programming interface (API) by which the example operator display module 206 can define and/or select the alarm presentation interface 210 via the operator application 208, and cause and/or instruct the operating system 204 to display the defined and/or selected alarm presentation interface 210. An example alarm presentation interface 210 is described below in connection with FIGS. 3A-3C.

To present process control system operator displays and/or applications, the example operator station 104 of FIG. 2 includes the example operator display module 206. The example operator display module 206 of FIG. 2 collects alarm data and/or information from one or more process controllers (e.g., the example controller 102 of FIG. 1) and/or other elements of a process control system, and uses the collected alarm data and/or information to create and/or define a particular alarm presentation interface 210 (e.g., the example alarm presentation interface of FIGS. 3A-3C) via the operator application 208. The created and/or defined display is displayed at the example display 212 by and/or via the example operating system 204. The example operator display module 206 also receives operator inputs via the alarm presentation interface 210 (e.g., in response to the operator selecting, adjusting and/or operating elements of the alarm presentation interface 210) to update the alarm presentation interface 210 via the operator application 208.

While an example manner of implementing the example operator station 104 of FIG. 1 has been illustrated in FIG. 2, the data structures, elements, processes and devices illustrated in FIG. 2 may be combined, divided, re-arranged, omitted, eliminated and/or implemented in any other way. Further, the example operating system 204, the example operator display module 206, the example alarm presentation interface 210, and/or, more generally, the example operator station 104 of FIG. 2 may be implemented by hardware, software, firmware and/or any combination of hardware, software and/or firmware. Further still, the example operator station 104 may include additional elements, processes and/or devices instead of, or in addition to, those illustrated in FIG. 2, and/or may include more than one of any or all of the illustrated data structures, elements, processes and devices.

Figure 3A:
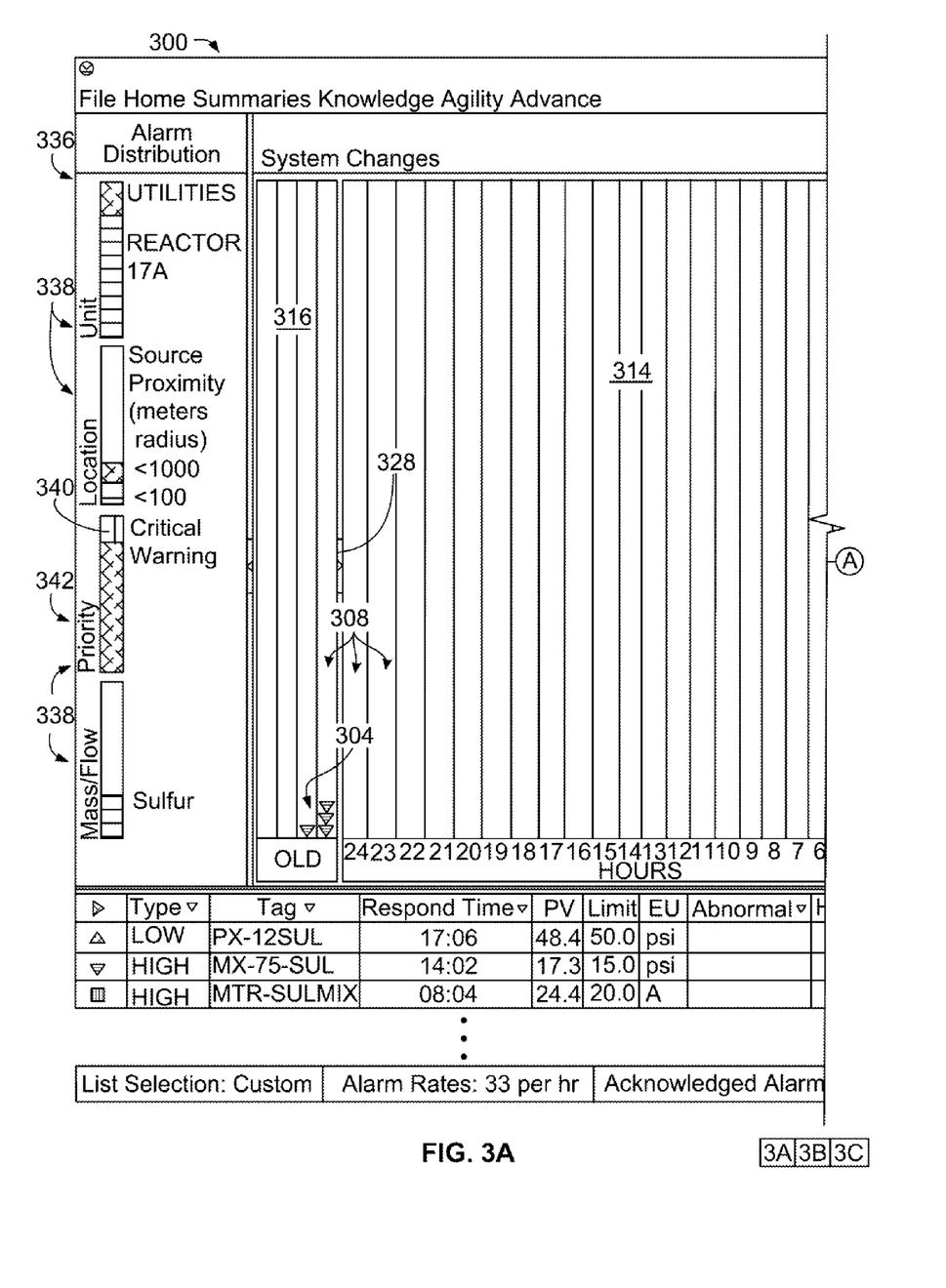
FIG. 3A illustrates a portion of an example alarm presentation interface that may be used to implement an operator display and/or application and/or, more generally, the example operator station of FIG. 1.
Figure 3B:
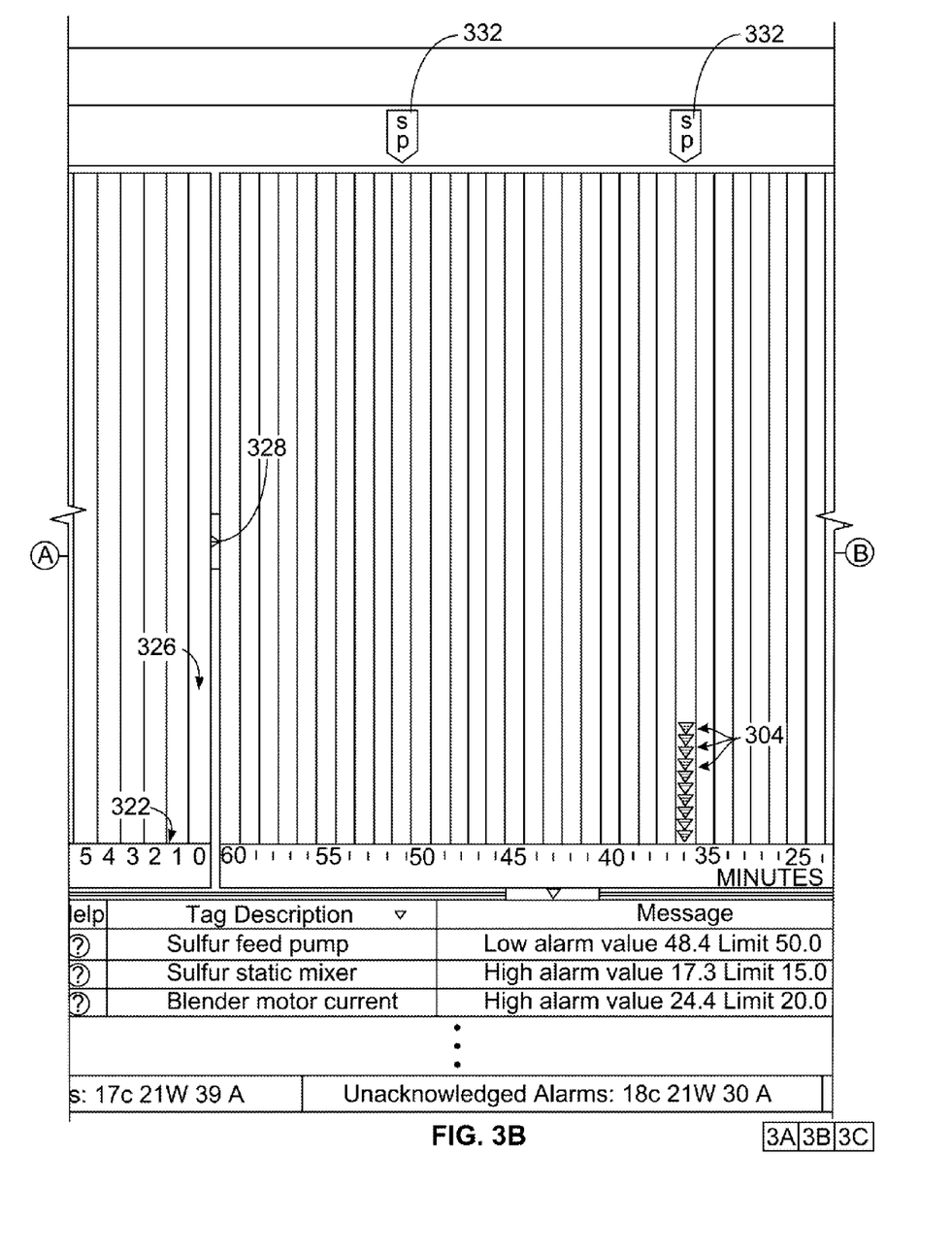
FIG. 3B is another portion of the example alarm presentation interface of FIG. 3A.
Figure 3C:
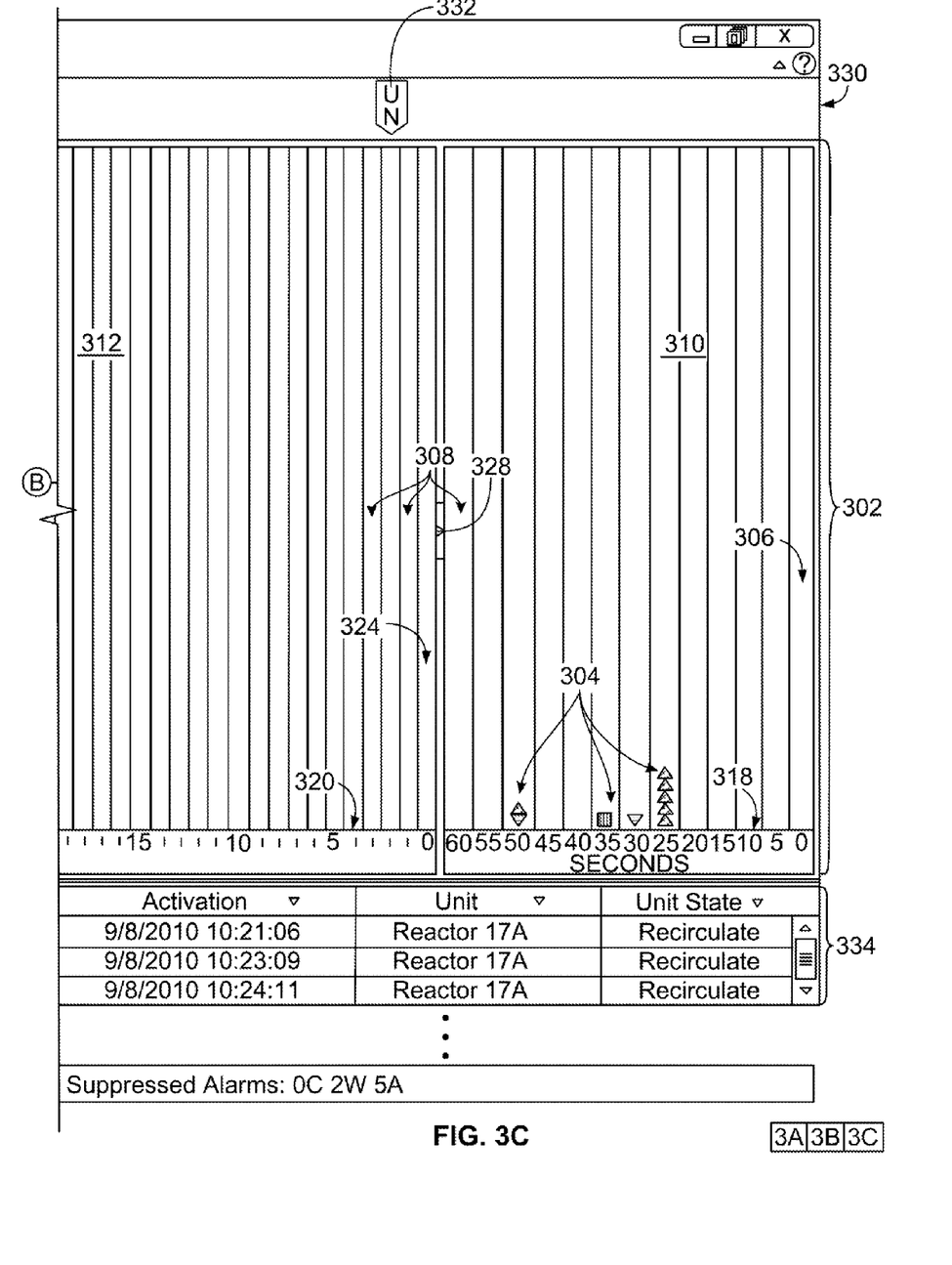
FIG. 3C is another portion of the example alarm presentation interface of FIGS. 3A and 3B.

FIGS. 3A-3C illustrate an example alarm presentation interface 300 that may be used to implement an operator display and/or operator application, and/or, more generally, the example operator station 104 of FIG. 1. The example alarm presentation interface 300 includes a timeline 302 to graphically represent the temporal relationship of all active alarms by displaying alarm icons 304 corresponding to each alarm along the timeline 302. When alarms are first triggered (i.e., become active), corresponding alarm icons 304 appear in the right most column 306 of the timeline 302. As time passes, the active alarms shift left across the timeline 302 at fixed time increments within a corresponding column 308, thereby graphically preserving the temporal relationships of the alarms. Within any one time increment, there may be multiple active alarm icons 304. To represent the temporal relationships of alarms within a single column 308 of the timeline 302, the corresponding alarm icons 304 may be stacked in chronological order beginning at the bottom of the column 308.

Some alarms may remain unresolved for extended periods of time (i.e., a stale alarm). Thus, in order to display all alarms on the alarm presentation interface 300 without requiring horizontal scrolling, the timeline 302 is separated into multiple time spans 310, 312, 314, and 316. Each of the time spans 310, 312, and 314 has a corresponding timescale. In this example, the first time span 310 has a timescale 318 spanning from 0 to 60 seconds in 5 second increments, the second time span 312 has a timescale 320 spanning from 0 to 60 minutes in 1 minute increments, and the third time span 314 has a timescale 322 spanning from 0 to 24 hours in 1 hour increments. As such, when multiple alarms are triggered within a single minute, the corresponding alarm icons 304 are temporally spaced apart as they shift across the timeline 302 in 5 second increments in the columns 308 of the first time span 310 based on the time at which each alarm was triggered. After a minute passes, the alarm icons 304 shift left into the second time span 312 and are stacked within the right most column 324 of the second time span 312. The alarm icons 318 are all within one column of the second time span 312 because the corresponding alarms all occurred within a single minute and each column in the second time span 312 corresponds to one minute. The alarm icons 304 continue shifting left as a cluster (i.e., stacked in a single column) until reaching the right most column 326 of the third time span 314, where they are grouped with all alarms triggered within the same one hour increment.

The fourth time span 316 does not have a timescale. Rather, the fourth time span 316 is labeled "old," and provides a location for all alarms more than 24 hours old (e.g., stale alarms) to be displayed in the example alarm presentation interface 300. As such, all alarms that remain active for over 24 hours are restacked in the left most columns 308 of the timeline 302 to allow all active alarms to remain on the timeline 302 without the need for horizontal scrolling.

Between each of the example time spans 310, 312, 314, and 316 an adjustable boundary 328 is provided to enable an operator to adjust the widths of each of the time spans 310, 312, 314, and 316 by clicking on and moving (e.g., using a mouse or any other device) the adjustable boundary 328 horizontally to space alarms in a particular time span as needed. However, while an operator may adjust the boundaries 328 for each time span 310, 312, 314, and 316, a minimum width may be set for each time span 310, 312, 314, and 316 so that visibility remains for all alarms, even when packed tightly together.

In addition to the alarm icons 304 on the timeline 302 indicating the temporal relationship of all alarms, the alarm icons 304 also vary by shape and color to indicate alarm priority (e.g., red squares for critical alarms and yellow triangles for warnings). Further, the alarm icons 304 may blink or otherwise vary in appearance (e.g., intensity, size, shape, etc.) to indicate when a particular alarm has not yet been acknowledged. If unacknowledged alarms become inactive, the corresponding alarm icons 304 have a modified appearance. If alarms are acknowledged and become inactive, the corresponding alarm icons 304 are removed from the timeline 302. Any remaining alarm icons 304 retain their vertical positions within each of the columns 308 and their relative temporal positions along the timeline 302.

The example alarm presentation interface 300 of FIGS. 3A-3C also includes a system changes bar 330 located above the timeline 302. The example system changes bar 330 may contain flags 332 representative of manual control actions, such as, SP—a setpoint change, MD—a mode change, OU—an output change, PR—a parameter change, and MD—a manual change (e.g., an outside operator action as reported by Syncade™ software, sold by Emerson Process Management). The flags 332 are also presented for UN—a unit state transition such as a transition from "idle" to "running." The flags 332 are placed in the system changes bar 330 and graphically linked to the timeline 302, thereby enabling an operator to visually perceive the temporal relationships of manual control actions and/or unit state changes to the alarms represented by alarm icons 304 on the timeline 302. In this manner, operators can graphically determine whether some of the most common alarm contributors (i.e., manual control actions and process state changes) are a root cause of one or more alarms without having to spend time checking an event log.

There may be circumstances where operators desire to see additional information regarding specific alarms represented in the timeline 302. As such, the example alarm presentation interface 300 enables operators to mouse hover over an alarm icon 304 or a flag 332 to cause additional information to pop up in, for example, a magnifying glass view. Operators may also access additional alarm information by transferring alarms displayed on timeline 302 into an optional alarm list 334 to display additional information in tabular form located below the timeline 302. The alarms included in the alarm list 334 may be selected individually by clicking on the corresponding alarm icons 304 in the timeline 302, or may be selected in mass through marquee mouse controls (e.g., clicking and dragging the mouse to form a rectangular box around the desired alarm icons 304). The example alarm presentation interface 300 also enables operators to populate the alarm list 334 with all active alarms with a single mouse click. Similarly, when operators are finished reviewing a particular alarm list, the list can be cleared with a single mouse click and the example alarm presentation interface 300 set to build a new list.

Once the alarm list 334 is populated with the desired alarms, operators can sort and filter the alarm list 334. However, any sorting or working with the data in the alarm list 334 does not affect the temporal relationships and patterns of the alarms preserved in the timeline 302. However, the alarm list 334 does interact with the timeline 302. For example, when one or more alarms are selected in the alarm list 334 (e.g., by highlighting the alarm(s)), the corresponding icons 304 within the timeline 302 are visually distinguished (e.g., by highlighting, enlarging, etc.) to allow rapid identification of the selected alarms in the timeline 302.

In addition to selecting multiple alarms to populate the alarm list 334 described above, the example alarm presentation interface 300 allows for other in-context actions to be taken by an operator for one or multiple alarms such as acknowledging or shelving the selected alarms. Moreover, the in-context action capability of the alarm presentation interface 300 is able to recognize which actions are allowed for the selected alarms and preventing improper actions from being taken.

Also illustrated in FIG. 3A is an alarm distribution sidebar 336 that provides summary graphics 338 based on aggregated data that groups all active alarms into distribution charts based on certain characteristics. For example, the summary graphics 338 may include distributions of alarms by priority, area, batch number, physical location, etc. In this way, an operator can assess the overall state of the process control system with a single glance at the alarm presentation interface 300. All alarms sharing a common characteristic within one of the summary graphics 338 can be mass transferred to the alarm list 334 by clicking on that portion of the summary graphic 338. For example, clicking on a critical priority segment 340 of an alarm priority distribution bar chart 342 puts all critical alarms into the alarm list 334 with additional information corresponding to those alarms.

In addition to the foregoing, the example alarm presentation interface 300 also allows abnormal indications to be temporarily overlaid (i.e., ghosted) on top of the timeline 302. The abnormal indications include: suppressed alarm activation, interlock activation, bypass activation, permission deactivation, device alert activation, and system hardware alert activation to check for further indications of a root cause.

Figure 4:
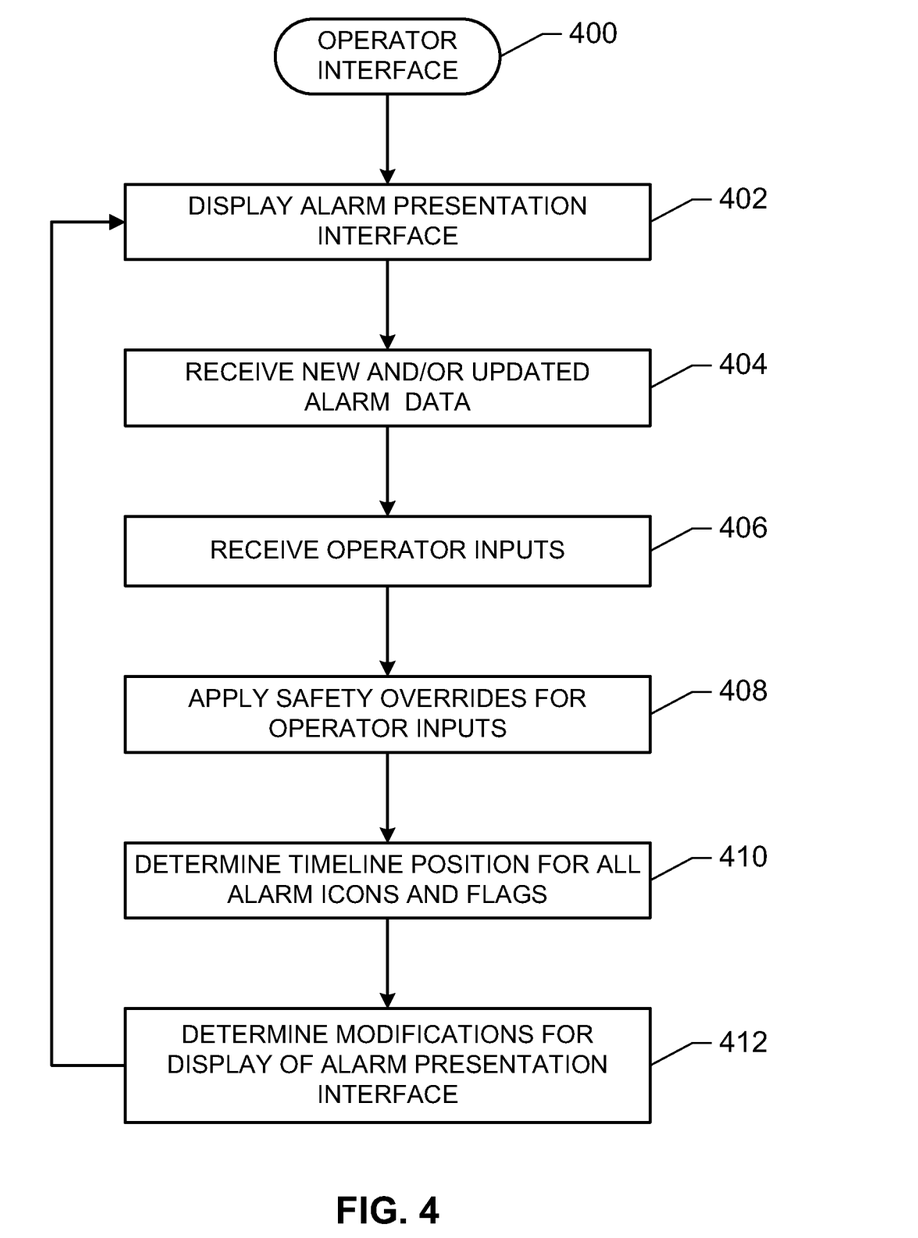
FIG. 4 is a flowchart representative of an example process that may be carried out to implement the example operator station of FIGS. 1 and/or 2

FIG. 4 is a flowchart representative of an example process for implementing the operator station 104 of FIGS. 1 and/or 2. The example process of FIG. 4 may be carried out by a processor, a controller and/or any other suitable processing device. For example, the process of FIG. 4 may be embodied in coded instructions stored on a tangible machine accessible or readable medium such as a flash memory, a ROM and/or random-access memory RAM associated with a processor (e.g., the example processor 502 discussed below in connection with FIG. 5). As used herein, the term tangible computer readable medium is expressly defined to include any type of computer readable storage and to exclude propagating signals. Additionally or alternatively, the example process of FIG. 4 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example operations of FIG. 4 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, one or more of the operations depicted in FIG. 4 may be implemented manually or as any combination of any of the foregoing techniques, for example, any combination of firmware, software, discrete logic and/or hardware. Further, although the example process of FIG. 4 is described with reference to the flowchart of FIG. 4, persons of ordinary skill in the art will readily appreciate that many other methods of implementing the example process of FIG. 4 may be employed. For example, the order of execution of the blocks may be changed, and/or some of the blocks described may be changed, eliminated, sub-divided, or combined. Additionally, persons of ordinary skill in the art will appreciate that any or all of the example operations of FIG. 4 may be carried out sequentially and/or carried out in parallel by, for example, separate processing threads, processors, devices, discrete logic, circuits, etc.

The process of FIG. 4 begins at block 400 with an operator station (e.g., the example operator station 104 of FIG. 2) running an operator display module (e.g., the example operator display module 206) to display an alarm presentation interface (e.g., the example alarm presentation interface 210) at block 402. At block 404, the operator station (e.g., the example operator station 104) receives new and/or updated alarm data via process controllers (e.g., the example controller 102). At block 406, the operator station (e.g., the example operator station 104) receives input data from the operator (e.g., acknowledgment of alarms, state changes, manual control actions, alarm list selections, etc.) via the alarm presentation interface (e.g., the example alarm presentation interface 210). At block 408, an operator application (e.g., the example operator application 208) applies any applicable safety overrides to the inputs received from the operator via the alarm presentation interface (e.g., the example alarm presentation interface 210). At block 410, the operator application (e.g., the example operator application 208) determines the timeline position of each alarm icon and/or flag input by the operator. At block 412, the operator application (e.g., the example operator application 208) determines which aspects of the alarm presentation interface (e.g., the example alarm presentation interface 210) need to be changed and then notifies the operator display module (e.g., the example operator display module 206) of the changes. Control then returns to block 402 to display the updated alarm presentation interface (e.g., the example alarm presentation interface 210).

Figure 5:
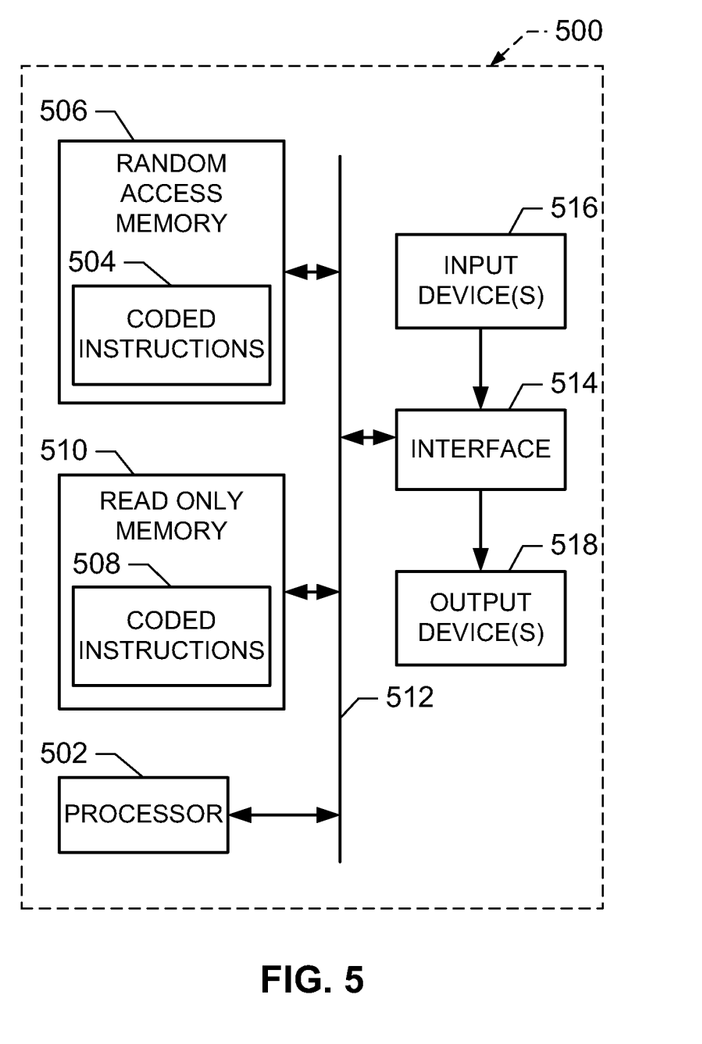
FIG. 5 is a schematic illustration of an example processor platform that may be used and/or programmed to carry out the example process of FIG. 4 and/or, more generally, to implement the example operator station of FIG. 1.

FIG. 5 is a schematic diagram of an example processor platform 500 that may be used and/or programmed to implement any or all of the example operator stations 104 of FIGS. 1 and/or 2. For example, the processor platform 500 can be implemented by one or more general purpose processors, processor cores, microcontrollers, etc.

The processor platform 500 of the example of FIG. 5 includes at least one general purpose programmable processor 502. The processor 502 executes coded instructions 504 and/or 508 present in main memory of the processor 502 (e.g., within a RAM 506 and/or a ROM 510). The processor 502 may be any type of processing unit, such as a processor core, a processor and/or a microcontroller. The processor 502 may execute, among other things, the example process of FIG. 4 to implement the example operator stations 104 described herein. The processor 502 is in communication with the main memory (including a ROM 510 and/or the RAM 506) via a bus 512. The RAM 506 may be implemented by DRAM, SDRAM, and/or any other type of RAM device, and ROM may be implemented by flash memory and/or any other desired type of memory device. Access to the memories 506 and 510 may be controlled by a memory controller (not shown).

The processor platform 500 also includes an interface circuit 514. The interface circuit 514 may be implemented by any type of interface standard, such as a USB interface, a Bluetooth interface, an external memory interface, serial port, general purpose input/output, etc. One or more input devices 516 and one or more output devices 518 are connected to the interface circuit 514. The input devices 516 and/or output devices 518 may be used to, for example, provide the alarm presentation interface 210 to the example display 212 of FIG. 2.

Although certain example methods, apparatus and articles of manufacture have been described herein, the scope of coverage of this patent is not limited thereto. Such examples are intended to be non-limiting illustrative examples. On the contrary, this patent covers all methods, apparatus and articles of manufacture fairly falling within the scope of the appended claims either literally or under the doctrine of equivalents.

What is claimed is:

1. An operator interface apparatus for a process control system comprising:
a display;
an operator display module to present an operator application on the display;
an alarm presentation interface to be presented on the display via the operator application, wherein the alarm presentation interface includes a timeline to graphically indicate a temporal relationship of a plurality of active alarms of the process control system by displaying an icon associated with each of the active alarms along the timeline, wherein a manual control action is presented in the timeline to indicate a temporal relationships of the manual control action to the active alarms.

2. The operator interface apparatus as defined in claim 1, wherein the temporal relationship of the active alarms is preserved in the timeline to enable an operator to detect a root cause of an alarm flood.

3. The operator interface apparatus as defined in claim 1, wherein the icons associated with the active alarms shift across the timeline at one or more periodic time intervals, and wherein the timeline includes a location to display icons associated with stale ones of the active alarms to enable the display of all active alarms.

4. The operator interface apparatus as defined in claim 3, wherein the timeline contains a first time span with a first timescale to display a newest portion of the icons associated with a newest portion of the active alarms, and a second time span with a second timescale to display an older portion of icons associated with an older portion of the active alarms, wherein one of the periodic time intervals corresponds to the first timescale and another one of the periodic time intervals corresponds to the second timescale.

5. The operator interface apparatus as defined in claim 4, wherein the first and second time spans are to be spatially adjusted relative to one another along the timeline.

6. The operator interface apparatus as defined in claim 1, wherein the alarm presentation interface includes an alarm distribution display to present a summary graphic of data associated with the active alarms.

7. The operator interface apparatus as defined in claim 6, wherein the alarm presentation interface includes an alarm list display to present a list of a portion of the active alarms represented on the timeline along with information associated with each of the alarms in the portion of the active alarms.

8. The operator interface apparatus as defined in claim 7, wherein the portion of the active alarms corresponds to an aggregated grouping of active alarms represented in the alarm distribution display.

9. The operator interface apparatus as defined in claim 7, wherein the portion of the active alarms is determined by an operator selecting a portion of the icons associated with the portion of the active alarms via the timeline.

10. The operator interface apparatus as defined in claim 6, wherein the alarm list display is to be altered by an operator independent of the display of the timeline.

11. The operator interface apparatus as defined in claim 1, wherein a process state change is presented in the timeline to indicate a temporal relationship of the process state change to the active alarms.

12. The operator interface apparatus as defined in claim 1, wherein a priority of each of the active alarms is indicated by an appearance of the icon associated with the active alarm.

13. A method comprising:
receiving alarm data for a plurality of process control alarms from at least one of a process controller or a field device;
receiving data associated with a process state change;
generating a timeline, based on the alarm data, graphically indicating a temporal relationship of the plurality of process control alarms via an icon corresponding to each of the process control alarms;
modifying the timeline to include a representation of the process state change to indicate a temporal relationship of the process state change to the process control alarms; and
displaying the timeline via an operator interface.

14. The method as defined in claim 13, wherein the temporal relationship of the process control alarms is preserved to enable an operator to detect a root cause of an alarm flood.

15. The method as defined in claim 13, further comprising:
receiving a change to the alarm data;
modifying the timeline based on the changed alarm data; and
displaying the modified timeline via the operator interface.

16. The method as defined in claim 13, wherein the timeline contains a first time span with a first timescale to display a first portion of the icons corresponding to a newest portion of the process control alarms, and a second time span with a second timescale to display a second portion of the icons corresponding to an older portion of the process control alarms.

17. The method as defined in claim 16, wherein the first and second time spans are spatially adjusted relative to one another along the timeline.

18. The method as defined in claim 16, further comprising:
shifting the first portion of the icons across the timeline at a first periodic time interval corresponding to the first timescale; and
shifting the second portion of the icons across the timeline at a second periodic time interval corresponding to the second timescale.

19. The method as defined in claim 18, wherein the timeline includes a location to display stale ones of the process control alarms to enable the timeline to display all the icons corresponding to all the process control alarms.

20. The method as defined in claim 13, further comprising:
receiving a selection of a portion of the process control alarms by an operator via the operator interface; and
displaying the alarm data of the portion of the process control alarms in list format via the operator interface.

21. The method as defined in claim 20, wherein the selection of the portion of the process control alarms is received via a selection of a portion of the icons on the timeline corresponding to the portion of the process control alarms.

22. The method as defined in claim 20, wherein the list of the alarm data of the portion of process control alarms is altered by an operator independent of the display of the timeline.

23. The method as defined in claim 13, further comprising:
grouping the process control alarms according to one or more alarm characteristics associated with the process control alarms;
generating an alarm distribution display to graphically summarize the one or more characteristics associated with the process control alarms; and
displaying the alarm distribution display via the operator interface.

24. The method as defined in claim 23, further comprising:
receiving a selection of one of the one or more alarm characteristics by an operator; and
displaying the process control alarms associated with the selected alarm characteristic in list format via the operator interface.

25. The method as defined in claim 13, further comprising:
receiving data associated with a manual control action;
modifying the timeline to include a representation of the manual control action to indicate a temporal relationship of the manual control action to the process control alarms; and
displaying the modified timeline via the operator interface.

26. The method as defined in claim 13, wherein a priority of each of the process control alarms is indicated by an appearance of the icon associated with each of the process control alarms.

27. A tangible article of manufacture storing machine readable instructions which, when executed, cause a machine to:
receive alarm data for a plurality of process control alarms from at least one of a process controller or a field device;
generate a timeline, based on the alarm data, graphically indicating a temporal relationship of the plurality of process control alarms via an icon corresponding to each of the process control alarms, wherein at least one of a manual control action or a process state change is presented in the timeline to indicate a temporal relationship of the at least one of the manual control action or the process state change to the process control alarms; and
display the timeline via an operator interface.

28. The tangible article of manufacture as defined in claim 27, wherein the temporal relationship of the process control alarms is preserved to enable an operator to detect a root cause of an alarm flood.

29. The tangible article of manufacture as defined in claim 27, wherein the machine readable instructions, when executed, further cause the machine to:
  receive a change to the alarm data;
  modify the timeline based on the change to the alarm data; and
  display the modified timeline via the operator interface.

30. The tangible article of manufacture as defined in claim 27, wherein the timeline contains a first time span with a first timescale to display a first portion of the icons corresponding to a newest portion of the process control alarms, and a second time span with a second timescale to display a second portion of the icons corresponding to an older portion of the process control alarms.

31. The tangible article of manufacture as defined in claim 30, wherein the machine readable instructions, when executed, further cause the machine to:
  shift the first portion of the icons across the timeline at a first periodic time interval corresponding to the first timescale; and
  shift the second portion of the icons across the timeline at a second periodic time interval corresponding to the second timescale.

32. The tangible article of manufacture as defined in claim 31, wherein the timeline includes a location to display stale ones of the process control alarms to enable the timeline to display all the icons corresponding to all the process control alarms.

* * * * *

UNITED STATES PATENT AND TRADEMARK OFFICE
CERTIFICATE OF CORRECTION

PATENT NO.         : 8,779,916 B2                                        Page 1 of 1
APPLICATION NO.    : 13/279583
DATED              : July 15, 2014
INVENTOR(S)        : Van Camp et al.

It is certified that error appears in the above-identified patent and that said Letters Patent is hereby corrected as shown below:

In the Claims

Column 10, line 51 (claim 1), delete "relationships" and insert -- relationship --.

Signed and Sealed this
Thirtieth Day of September, 2014

Michelle K. Lee
*Deputy Director of the United States Patent and Trademark Office*